United States Patent
Nakano

(10) Patent No.: US 9,469,375 B2
(45) Date of Patent: Oct. 18, 2016

(54) CHAIN GUIDE STRUCTURE FOR CHAIN DRIVE TYPE TRANSMISSION MECHANISM

(71) Applicant: HONDA MOTOR CO., LTD., Tokyo (JP)

(72) Inventor: Kenichi Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 14/640,748

(22) Filed: Mar. 6, 2015

(65) Prior Publication Data
US 2015/0259030 A1 Sep. 17, 2015

(30) Foreign Application Priority Data
Mar. 11, 2014 (JP) .................................. 2014-047064

(51) Int. Cl.
| | | |
|---|---|---|
| F16H 7/18 | (2006.01) | |
| B62J 13/00 | (2006.01) | |
| F16D 1/00 | (2006.01) | |
| F16H 57/02 | (2012.01) | |
| B62M 9/06 | (2006.01) | |
| B62M 9/00 | (2006.01) | |

(52) U.S. Cl.
CPC ................. B62M 9/06 (2013.01); F16H 7/18 (2013.01); *B62M 2009/007* (2013.01)

(58) Field of Classification Search
CPC .......... F16H 7/18; F16H 7/023; B62J 13/00; B65G 21/22; B27B 33/14
USPC ................................................ 474/140, 144
See application file for complete search history.

(56) References Cited

U.S. PATENT DOCUMENTS

| | | | | | |
|---|---|---|---|---|---|
| 2,342,091 | A | * | 2/1944 | Schroeder | B66D 3/26 254/372 |
| 2,924,110 | A | * | 2/1960 | Gudnmundsen | B27B 33/14 30/383 |
| 3,656,361 | A | * | 4/1972 | Honda | F16H 7/06 474/140 |
| 3,724,582 | A | * | 4/1973 | Wood | B62J 13/04 180/219 |
| 3,921,468 | A | * | 11/1975 | Wright | B65G 21/22 474/140 |
| 5,232,408 | A | * | 8/1993 | Brown | F16H 7/18 226/172 |
| 5,445,568 | A | * | 8/1995 | Fukuzawa | B62J 13/00 474/144 |
| 5,580,325 | A | * | 12/1996 | Hirota | F02B 77/081 474/144 |
| 6,544,134 | B2 | * | 4/2003 | Ohyama | B62M 7/12 474/144 |
| 7,344,462 | B1 | * | 3/2008 | Lund | F16H 7/18 474/155 |

(Continued)

FOREIGN PATENT DOCUMENTS

JP 6-255559 A 9/1994

*Primary Examiner* — Henry Liu
(74) *Attorney, Agent, or Firm* — Birch, Stewart, Kolasch & Birch, LLP

(57) ABSTRACT

A chain guide structure for a chain drive type transmission mechanism which ensures that even when a solid matter, such as a small stone, gets nipped and a strong impact is exerted on a chain guide, the chain guide deforms so as to absorb the impact and permit the small stone or the like to be swiftly eliminated. The chain guide fastened to the engine case is provided so as to cover a drive chain wound around a drive sprocket, at a part of the periphery of the drive sprocket and in an arcuate form. The chain guide is formed with a brittle portion lower in strength than other portions thereof. The brittle portion is located above and in the vicinity of a front end portion at which the chain guide is situated closest to the drive chain. Thus, an engine case can be protected from damage.

20 Claims, 6 Drawing Sheets

(56) References Cited

U.S. PATENT DOCUMENTS

| | | | | |
|---|---|---|---|---|
| 7,357,114 B2* | 4/2008 | Taki | ................ | B62J 13/00 123/198 D |
| 7,384,356 B2* | 6/2008 | Kim | ................ | B62J 13/04 192/85.5 |
| 7,951,031 B2* | 5/2011 | Hioki | ................ | B62J 13/04 123/198 E |
| 8,425,356 B2* | 4/2013 | Vachal | ................ | A01D 34/76 474/131 |
| 8,757,314 B2* | 6/2014 | Mizukura | ................ | B62M 7/00 180/228 |
| 2004/0033853 A1* | 2/2004 | Patmont | ................ | B62J 13/00 474/140 |
| 2005/0239590 A1* | 10/2005 | Foster | ................ | B65G 21/22 474/140 |
| 2005/0282670 A1* | 12/2005 | Kim | ................ | B62J 13/04 474/144 |
| 2006/0264284 A1* | 11/2006 | Iwaki | ................ | F16H 7/18 474/140 |
| 2007/0251346 A1* | 11/2007 | Taki | ................ | B62J 13/00 74/335 |
| 2008/0026895 A1* | 1/2008 | Johnson | ................ | F16H 7/18 474/150 |
| 2010/0005666 A1* | 1/2010 | Seigneur | ................ | B27B 17/00 30/138 |
| 2011/0015014 A1* | 1/2011 | Kroon | ................ | F16H 7/08 474/110 |
| 2013/0337955 A1* | 12/2013 | Ono | ................ | F02B 61/02 474/144 |
| 2014/0283665 A1* | 9/2014 | Seigneur | ................ | B27B 17/00 83/832 |

* cited by examiner

CHAIN GUIDE STRUCTURE FOR CHAIN DRIVE TYPE TRANSMISSION MECHANISM

CROSS-REFERENCE TO RELATED APPLICATIONS

The present application claims priority under 35 USC 119 to Japanese Patent Application No. 2014-047064 filed Mar. 11, 2014 the entire contents of which are hereby incorporated by reference.

BACKGROUND OF THE INVENTION

1. Field of the Invention

The present invention relates to a chain guide structure for a chain drive type transmission mechanism by which an output of an internal combustion engine mounted on a vehicle is transmitted to a rear wheel through a drive chain.

2. Description of Background Art

In a chain drive type transmission mechanism, in order that a drive chain wound around a drive sprocket fitted to an output shaft of an internal combustion engine will not be disengaged from the drive sprocket due to, for example, vibrations during operation of the vehicle, a chain guide is provided so as to cover the drive chain on the drive sprocket over a range from a front side of a radial periphery of the drive sprocket to an obliquely upper rear side of the periphery.

The chain guide is provided in proximity to the drive chain wound around the drive sprocket. At its rear-side portion, the chain guide restrains vibrations of the drive chain in a position where the drive chain starts being wound around the drive sprocket. At its front-side portion, the chain guide is situated closest to the drive chain, thereby preventing the drive chain from being disengaged from the drive sprocket.

In general, a chain guide is mounted to an engine case by being fastened to fastening boss portions of the engine case.

In the case of a vehicle designed for traveling on rough terrain, such as an off-road vehicle, a small stone or the like may spring up and may get nipped between a drive chain and a chain guide in the manner of being dragged in by the drive chain which is rotationally moving. In view of this, a large cover may be provided for preventing a small stone or the like from getting nipped between the drive chain and the chain guide. Or a contrivance may be made such that the impact load on the chain guide can be received in a satisfactory manner. See, for example, Japanese Patent Laid-Open No. Hei 6-255559.

In the chain guide structure disclosed in Japanese Patent Laid-Open No. Hei 6-255559, the chain guide is put in contact with a required part of a crankcase of an internal combustion engine.

Even if a small stone or the like gets nipped between the chain guide and a drive chain wound around a drive sprocket and an impact is exerted on the chain guide, the impact load can be received by the required part of the crankcase, and the small stone or the like can be eliminated.

However, depending on the conditions of the rough terrain, there may be cases where a small stone exceeding an anticipated size gets nipped between the chain guide surface and the drive chain. In such a case, if the impact load received by the chain guide is considerably high, the strong impact force received by the chain guide may possibly be exerted as a high load on a required part of a crankcase in contact with the chain guide, thereby damaging the required part together with fastening boss portions. Such a possibility should, naturally, be excluded.

SUMMARY AND OBJECTS OF THE INVENTION

It is an object of an embodiment of the present invention to provide a chain guide structure for a chain drive type transmission mechanism which ensures that when a solid matter such as a small stone gets nipped between a drive chain and a chain guide and a strong impact is exerted on the chain guide, the chain guide deforms so as to absorb the impact and permit the small stone or the like to be eliminated speedily, whereby an engine case can be protected from damage.

According to an embodiment of the present invention, there is provided a chain guide structure for a chain drive type transmission mechanism including a drive chain (24) for transmitting motive power, the drive chain (24) is looped around and between a drive sprocket (23) and a driven sprocket. The drive sprocket (23) is fitted to an output shaft (22) protruding outside from an engine case (11) of an internal combustion engine mounted on a vehicle with the driven sprocket being provided on a side of a rear wheel. A chain guide (30), fastened to the engine case (11), is provided so as to cover the drive chain (24) wound around the drive sprocket (23), at a part of a periphery of the drive sprocket (23) and in an arcuate form. The chain guide (30) is formed with a brittle portion (B) lower in strength than other portions thereof. The brittle portion (B) is located in an upper vicinity of a front end portion (31f) at which the chain guide (30) is situated closest to the drive chain (24).

According to an embodiment of the present invention, the chain guide structure for a chain drive type transmission mechanism includes a guide surface (31), facing the drive chain (24), of the chain guide (30) that is so disposed that a spacing between the guide surface (31) and the drive chain (24) gradually increases along an obliquely upward direction from the front end portion (31f) at which the spacing is the smallest.

According to an embodiment of the present invention, the chain guide structure for a chain drive type transmission mechanism includes the brittle portion (B) of the chain guide (30) that is formed by thinning (that is, partial removal of material).

According to an embodiment of the present invention, the chain guide structure for a chain drive type transmission mechanism includes a fastening portion (30a, 30b), fastened to the engine case (11), of the chain guide (30) that is provided in a position which is not in a direction from a center of rotation of the drive sprocket (23) toward the brittle portion (B).

According to an embodiment of the present invention, the chain guide structure for a chain drive type transmission mechanism includes the chain guide (30) that is fastened at its fastening portion (30a, 30b) to a fastening boss portion (11a, 11b) which is formed to project from the engine case (11) and to be brittle.

According to an embodiment of the present invention, the chain guide structure for a chain drive type transmission mechanism includes the guide surface (31) of the chain guide (30) that is configured so that the front end portion (31f) thereof that is situated closest to the drive chain (24) is at a lower end portion thereof. A portion thereof in a vicinity of a position where the drive chain (24) starts being wound around the drive sprocket (23) is a rear end portion (31r) thereof.

According to an embodiment of the present invention, the chain guide (30) fastened to the engine case (11) is provided so as to cover the drive chain (24) wound around the drive sprocket (23), at a part of the radial periphery of the drive sprocket (23) and in an arcuate form. In addition, the chain guide (30) is formed with the brittle portion (B) lower in strength than other portions thereof. The brittle portion (B) is located in an upper vicinity of the front end portion (31f) at which the chain guide (30) is situated closest to the drive chain (24). Therefore, when a solid matter such as a small stone is drawn in between the rotationally moving drive chain (24) and the chain guide (30) in the manner of being dragged by the drive chain (24), the solid matter is liable to get nipped between the chain guide (30) and the drive chain (24) either at the brittle portion (B), in the upper vicinity of the front end portion (31f) situated closest to the drive chain (24), or in the vicinity of the brittle portion (B), and a strong impact load is liable to be exerted on the brittle portion (B). In such a situation, the brittle portion (B) of the chain guide (30) is ruptured so as to absorb the impact and permit the small stone or the like to be eliminated swiftly, whereby the engine case (11) can be protected from damage.

Consequently, it is possible at low cost to perform an easy repair, by replacing only the chain guide (30), which is inexpensive.

According to an embodiment of the present invention, the guide surface (31), facing the drive chain (24), of the chain guide (30) is so arranged that the spacing between the guide surface (31) and the drive chain (24) gradually increases along an obliquely upward direction from the front portion at which the spacing is the smallest. This arrangement ensures that when a solid matter such as a small stone is drawn forward between the rotationally moving drive chain (24) and the guide surface (31) of the chain guide (30) in the manner of being dragged by the drive chain (24) from an upper rear side where the spacing between the drive chain (24) and the guide surface (31) is large, the solid matter gradually comes to be clamped between the drive chain (24) and the chain guide (30) arranged so that the spacing therebetween gradually decreases along a forward direction. Eventually, at the brittle portion (B) in the upper vicinity of the front end portion (310 at which the guide surface (31) of the chain guide (30) is situated closest to the drive chain (24), the solid matter can be nipped between the brittle portion (B) and the drive chain (24), exerting a great impact on the brittle portion (B). As a result, the brittle portion (B) of the chain guide (30) is ruptured so as to absorb the impact and permit the small stone or the like to be speedily eliminated, whereby the engine case (11) can be protected.

According to an embodiment of the present invention, the brittle portion (B) of the chain guide (30) is formed by thinning. This permits the brittle portion (B) to be formed at low cost through a simple machining or processing.

According to an embodiment of the present invention, the fastening portion (30a, 30b), fastened to the engine case (11), of the chain guide (30) is provided in a position which is not in the direction from the center of rotation of the drive sprocket (23) toward the brittle portion (B). This configuration ensures that when an impact load is exerted on the brittle portion (B) of the chain guide (30), the influence, if any, of the impact on the fastening portion (30a, 30b) for fastening to the engine case (11) can be reduced. In addition, the brittle portion (B) of the chain guide (30) can be ruptured easily and solely, without influencing the engine case (11). Consequently, the engine case (11) can be reliably protected from damage.

According to an embodiment of the present invention, the chain guide (30) is fastened at its fastening portion (30a, 30b) to a fastening boss portion (11a, 11b) which is formed to project from the engine case (11) and to be brittle. Therefore, the rupture of the brittle portion (B) due to the getting-nipped of a small stone or the like is accompanied by deformation of the fastening boss portion (11a, 11b). Consequently, the impact can be absorbed more assuredly, and a solid matter S can be easily discharged.

According to an embodiment of the present invention, the guide surface (31) of the chain guide (30) is configured so that the front end portion (31f) thereof situated closest to the drive chain (24) is at a lower end portion thereof. In addition, a portion thereof in the vicinity of a position where the drive chain (24) starts being wound around the drive sprocket (23) is a rear end portion (31r) thereof. In this configuration, the rear end portion (31r) of the guide surface (31) of the chain guide (30) restrains vibrations of the drive chain (24), and the front end portion (31f) of the guide surface (31) prevents the drive chain (24) from being disengaged from the drive sprocket (23). Thus, there is obtained the following effect. The solid matter such as a small stone that is dragged in may be so small-sized that it will not exert an impact load strong enough to rupture the brittle portion even if nipped at the brittle portion (B) in the upper vicinity of the front end portion (31f) situated closest to the drive chain (24). In such a case, the solid matter is readily discharged downwardly via the front end portion (31f) which is also the lower end portion of the guide surface (31) of the chain guide (30), to the exterior. Thus, the load exerted on the chain guide (30) in this situation can be removed speedily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment, disclosed by way of example, of the present invention will now be described below, referring to FIGS. 1 to 6.

Figure 1:
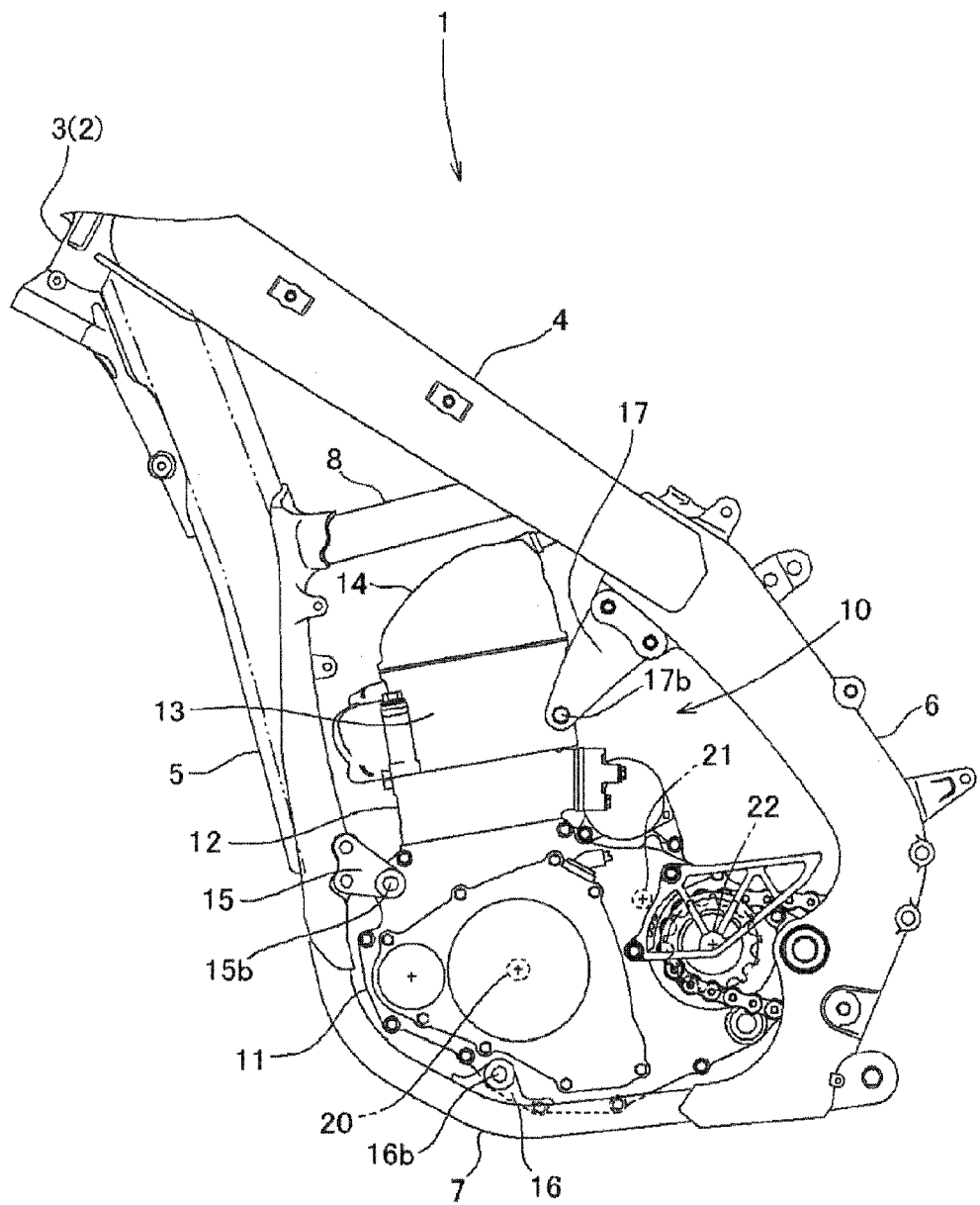
FIG. 1 is a side view of an internal combustion engine supported by a body frame of an off-road vehicle according to an exemplary embodiment of the present invention, and the surroundings of the internal combustion engine.

FIG. 1 is a side view of a part, where an internal combustion engine 10 is mounted on a motorcycle 1 according to the exemplary embodiment of the present invention.

Note that the frontward, rearward, leftward, and rightward directions in the descriptions in the specification and the appended claims are on a normal basis wherein the frontward direction is the direction of a straight forward operation of the motorcycle 10 according to this embodiment.

The motorcycle 1 in this embodiment is an off-road vehicle for traveling on rough terrain.

The internal combustion engine 10 is supported by a body frame 2, in which a main frame 4 extends obliquely rearwardly and downwardly from a head pipe 3. A down frame 5 extends from the head pipe 3, at a steeper downward inclination than that of the main frame 4. A center frame 6 extends downwardly from a rear end of the main frame 4. A lower end of the center frame 6 and a lower end of the down frame 5 are connected together by a connecting frame 7.

An upper portion of the down frame 5 and a rear portion of the main frame 4 are interconnected and reinforced by a reinforcement frame 8.

The internal combustion engine 10 is a water-cooled, single-cylinder, four-stroke-cycle internal combustion engine. A cylinder block 12 and a cylinder head 13 are fastened onto a crankcase 11 in a stacked manner, and an upper side of the cylinder head 13 is covered with a cylinder head cover 14, whereby an engine main body is configured.

The cylinder block 12, the cylinder head 13, and the cylinder head cover 14 stacked over the crankcase 11 extends upwardly, while slightly slanting forward, from the crankcase 11.

The internal combustion engine 10 is transversely mounted on the body frame 2, with a crankshaft 20 directed in the left-right direction.

The internal combustion engine 10 is supported by the body frame 2 in three positions. More specifically, the crankcase 11 is attached to and supported by a support bracket 15, which projects from a lower portion of the down frame 5, and a support bracket 16, which projects from a lowermost portion of the connecting frame 7, through support bolts 15b and 16b. In addition, a rear portion of the cylinder head 13 is attached to a support bracket 17, which projects from an upper end of the center frame 6, through a support bolt 17b.

The crankcase 11 is formed by uniting left and right halves. In a front half of the inside of the crankcase 11, the crankshaft 20 is rotatably arranged between left and right side walls of the left and right halves. In a rear half of the inside of the crankcase 11, a transmission is provided. More specifically, a main shaft 21 and a counter shaft 22 of the transmission are rotatably arranged between the left and right side walls.

Figure 3:
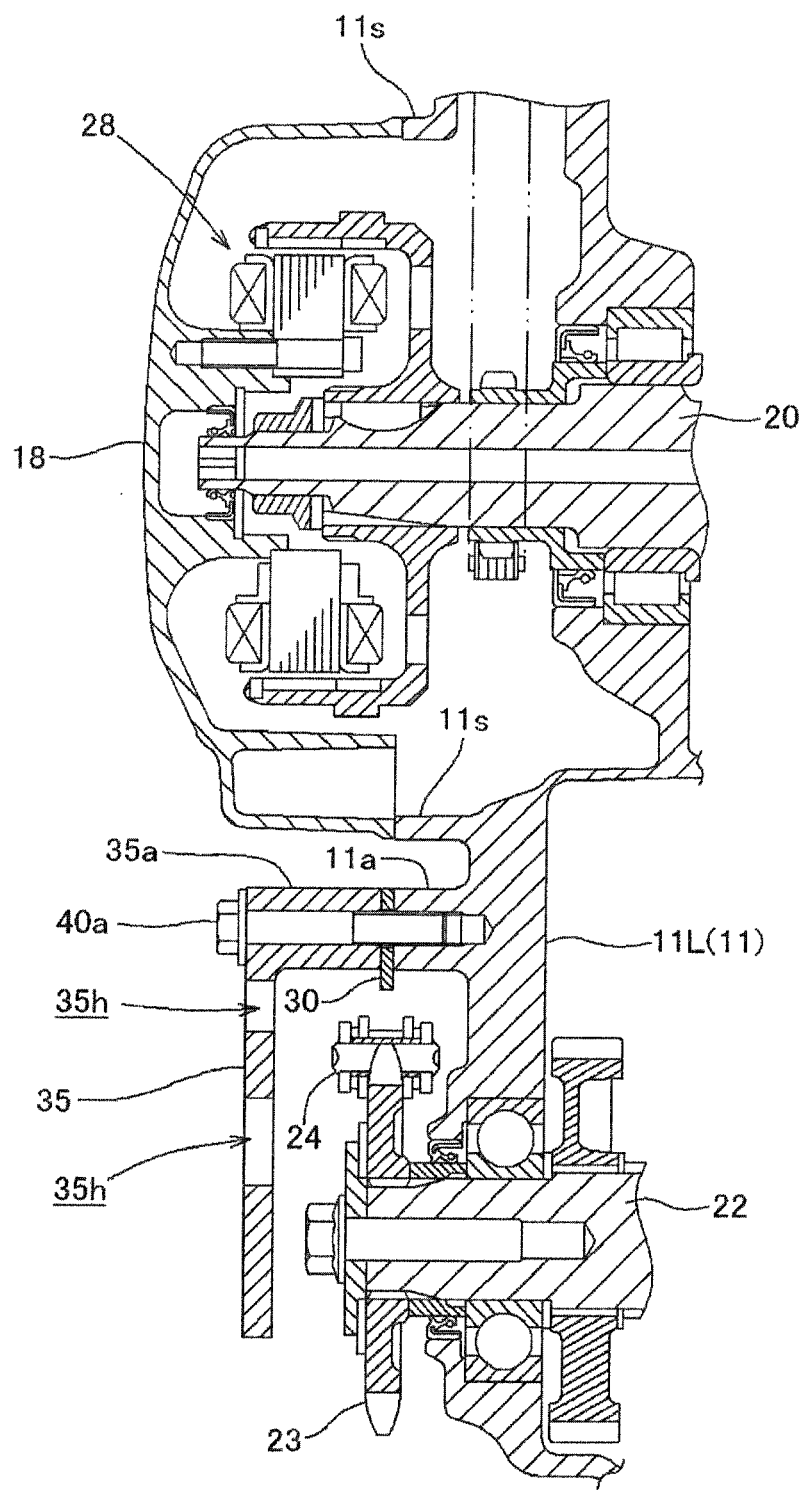
FIG. 3 is a partial sectional view of the internal combustion engine (a sectional view taken along line III-III of FIG. 2)

Referring to FIG. 3, an AC generator 28 is provided on a left-side shaft portion of the crankshaft 20 protruding by penetrating a left side wall 11L of the crankcase 11.

A circumferential wall 11s is formed to project from the left side wall 11L so as to surround the AC generator 28. An ACG cover 18 including a circumferential wall, which corresponds to the circumferential wall 11s, and a side wall covers the AC generator 28.

The counter shaft 22 in the transmission is the output shaft of the internal combustion engine 10. The left end of the counter shaft 22 protrudes to the outside by penetrating leftward the left side wall 11L of the crankcase 11 with a drive sprocket 23 being fitted to the left end.

The motorcycle 1 in this embodiment includes a chain drive type transmission mechanism, wherein a drive chain 24 is looped around and between the drive sprocket 23 and a driven sprocket (not illustrated) on the side of a rear wheel so as to transmit power to the rear wheel.

A chain guide 30 is attached to the left side wall 11L of the crankcase 11, in such a manner so as to surround the drive chain 24 (wound around the drive sprocket 23) in an arcuate form ranging from a front side to an obliquely upper side of the periphery of the drive sprocket 23.

In addition, a sprocket cover 35 is attached, in the manner of being co-fastened together with the chain guide 30, to the left side wall 11L of the crankcase 11 so as to cover the left side of the drive sprocket 23.

Figure 4:
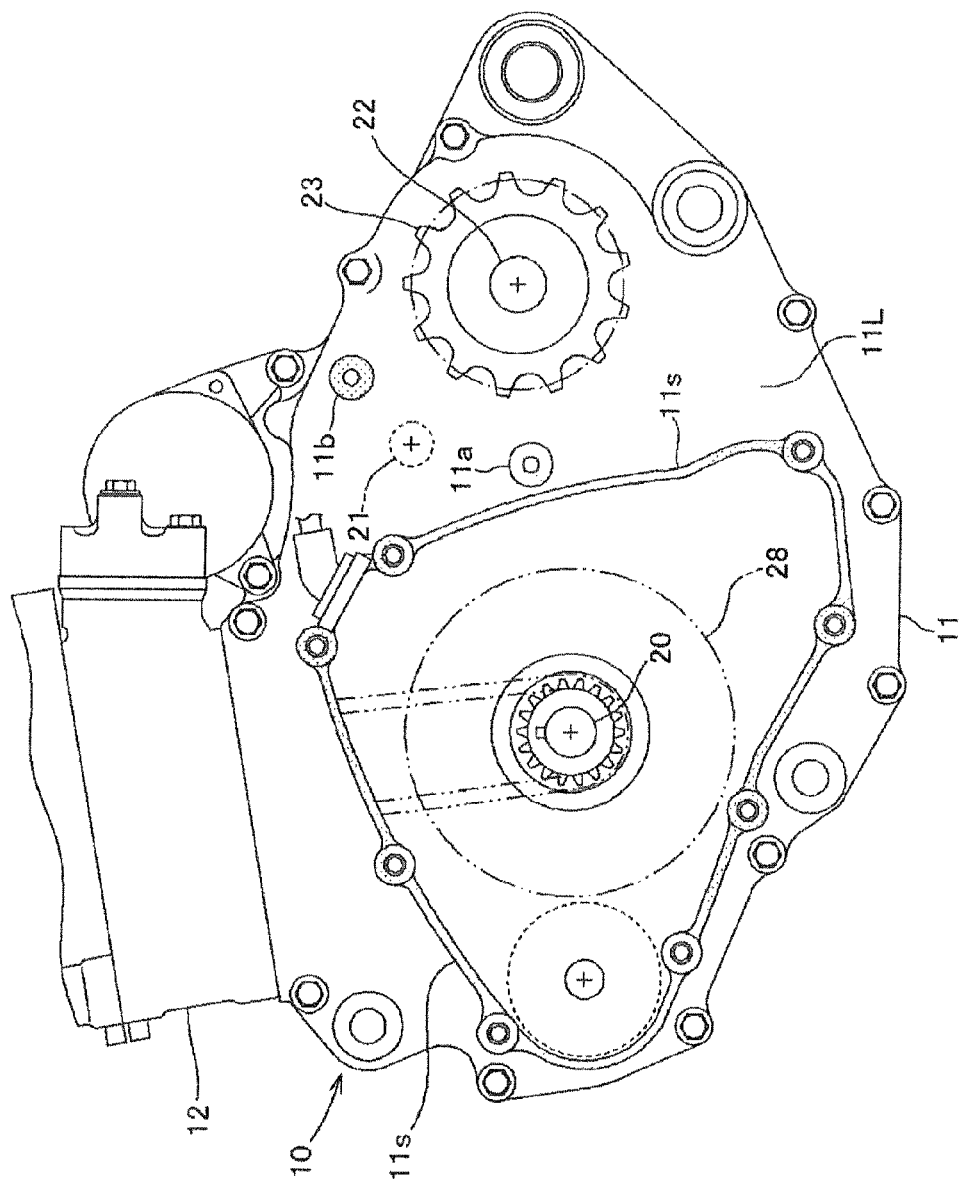
FIG. 4 is a partial side view showing a state where a sprocket cover and a chain guide are removed from the internal combustion engine.

As depicted in FIG. 4, the left side wall 11L of the crankcase 11 is projectingly formed with a fastening boss portions 11a and 11b (each having therein a female screw hole for a bolt) in those positions in the periphery of the drive sprocket 23 which are respectively on a front side and an obliquely upper side of the drive sprocket 23 (see FIG. 3).

The fastening boss portions 11a and 11b, which are cylindrical in shape, are formed to be thin in material thickness and be brittle.

The fastening boss portion 11a on the front side projects in a rear vicinity of the circumferential wall 11s projects from the left side wall 11L so as to surround the AC generator 28.

Bearing surfaces of the fastening boss portions 11a and 11b are substantially on the same vertical plane as an end face of the circumferential wall 11s.

Figure 5:
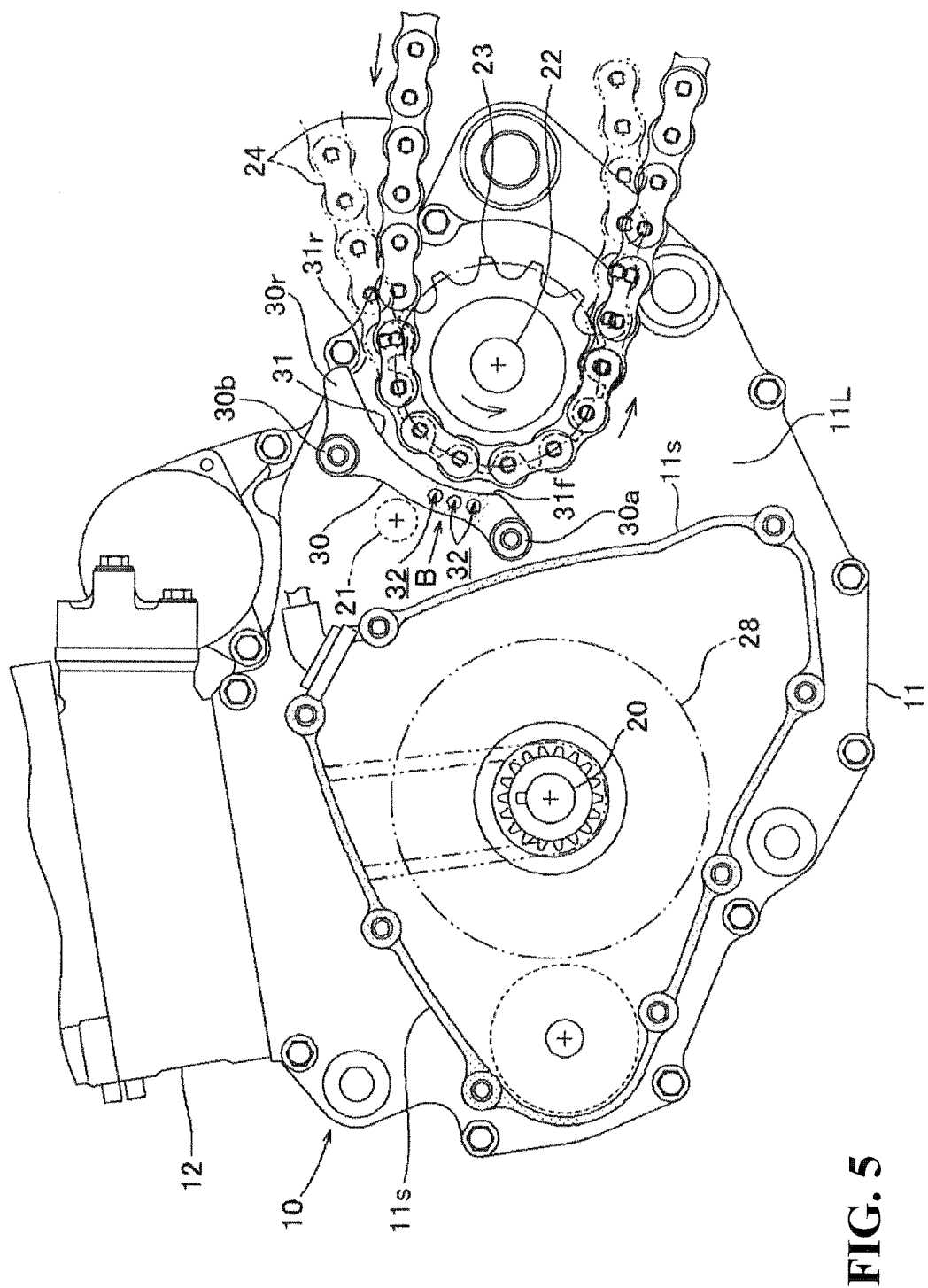
FIG. 5 is a partial side view showing a state where the internal combustion engine shown in FIG. 4 is equipped with the chain guide.

As depicted in FIG. 5, the chain guide 30 is a plate-like member, which is formed in a generally arcuate form ranging from a front side to an obliquely upper side of the periphery of the drive sprocket 23. A guide surface 31, facing the drive chain 24, of the chain guide 30 is disposed so that the spacing between itself and the drive chain 24 gradually increases from its front portion, at which the spacing is the smallest, toward the obliquely upper side.

The guide surface 31 of the chain guide 30 is configured so that a portion thereof situated closest to the drive chain 24 is a front end portion 31f thereof and a portion thereof in the vicinity of a position where the drive chain 24 starts being wound around the drive sprocket 23 is a rear end portion 31r thereof. A front end fastening portion 30a of the chain guide 30 is formed to project more to an obliquely front side than the front end portion 31f of the guide surface 31. The rear end portion 31r of the guide surface 31 is situated at a rear end part 30r of the chain guide 30.

As shown in FIG. 5, the arcuate plate-like chain guide 30 is formed therein with three small circular holes 32 (lightening holes) aligned on an arc, in an upper vicinity of the front end portion 31f of the guide surface 31 at which the guide surface 31 is situated closest to the drive chain 24.

Thus, the chain guide 30 is formed with a brittle portion B (the portion marked with scattered dots in FIG. 5) lower in strength than other portions due to the presence of the three small circular holes 32, in an upper vicinity of the front end portion 31f of the guide surface 31.

The chain guide 30 is formed with a rear-side fastening portion 30b which protrudes to an obliquely upper side from a portion, slightly spaced frontward from the rear end part 30r, of the chain guide 30.

In the chain guide 30, which is an arcuate plate-like member, the brittle portion B is located between the front end fastening portion 30a and the rear-side fastening portion 30b, nearer to the front end fastening portion 30a than to the rear-side fastening portion 30b.

The front end fastening portion 30a and the rear-side fastening portion 30b of the chain guide 30 are each provided with a bolt hole, corresponding respectively to the fastening boss portions 11a and 11b formed projecting from the left side wall 11L of the crankcase 11, and are put in contact with the bearing surfaces of the fastening boss portions 11a and 11b (see FIGS. 4 and 5).

The front end fastening portion 30a and the rear-side fastening portion 30b where the chain guide 30 is fastened to the crankcase 11 are not provided in a direction from the center of rotation of the drive sprocket 23 toward the brittle portion B.

Figure 2:
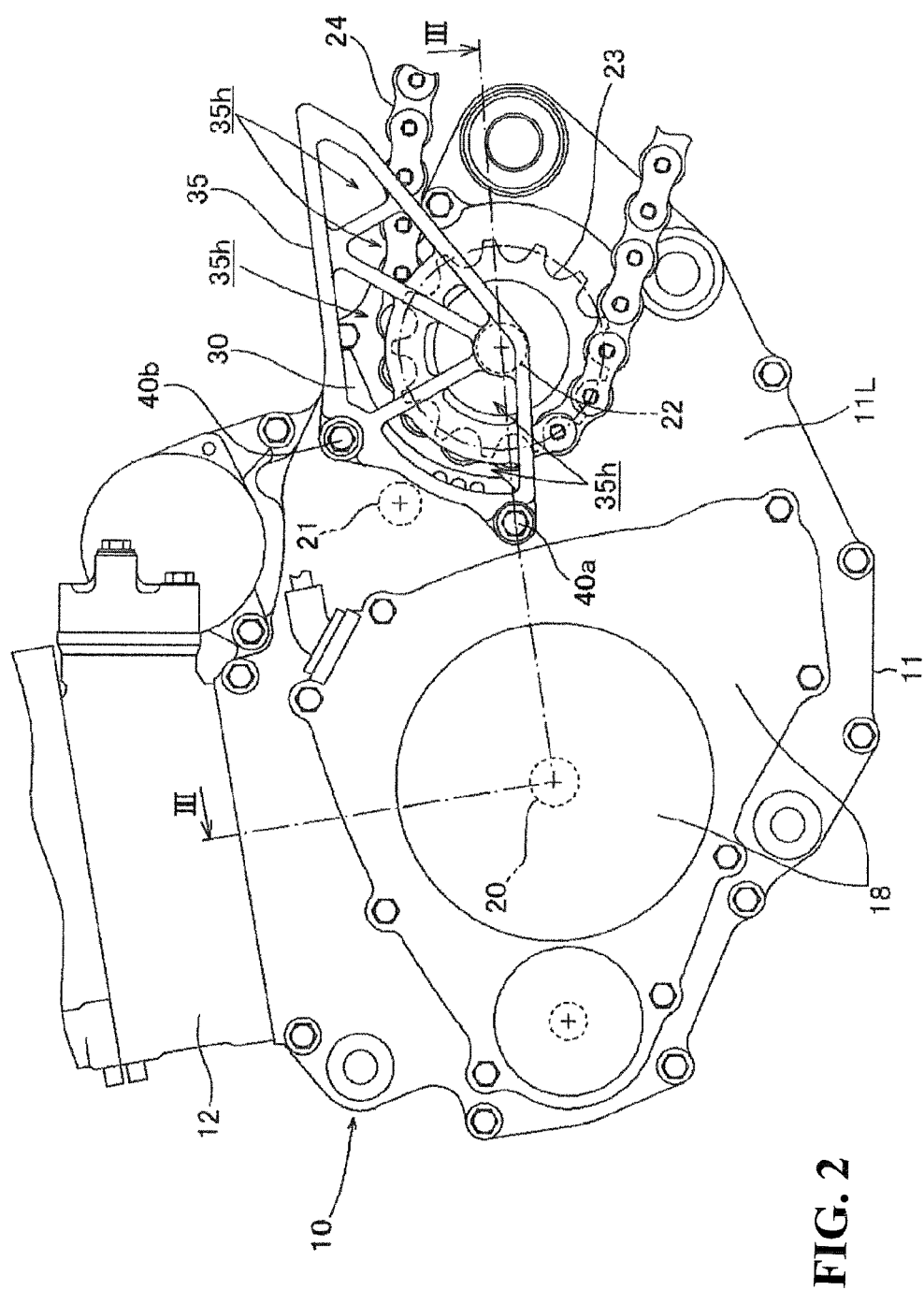
FIG. 2 is a partial side view of the internal combustion engine.

As depicted in FIG. 2, the sprocket cover 35 is arranged from the left side so as to cover a roughly upper half of the drive sprocket 23.

The sprocket cover 35 is a plate-like member that extends from a front side through an upper side to a rear side in a sector-like shape, centered on a portion facing the counter shaft 22, so as to cover the roughly upper half of the drive sprocket 23. The sprocket cover 35 is formed therein with a plurality of openings 35h for thinning, which are gradually enlarged as the sprocket cover 35 extends outwardly in the sector-like shape.

More particularly, that portion of the sprocket cover 35 which faces the arcuate gap between the guide surface 31 of the chain guide 30 and the drive chain 24 is formed therein with about two arcuate openings 35h.

At a lower end (front end) and an upper end of a front-side arcuate portion of the sprocket cover 35, there are formed cylindrical boss portions 35a and 35b which project to the inner side (right side) in the vehicle widthwise direction (see FIGS. 2 and 3).

The cylindrical boss portions 35a and 35b correspond respectively to the fastening boss portions 11a and 11b that are formed projecting from the left side wall 11L of the crankcase 11.

The chain guide 30 is disposed in a state in which the front end fastening portion 30a and the rear-side fastening portion 30b of the chain guide 30 are in contact with the bearing surfaces of the fastening boss portions 11a and 11b formed projecting from the left side wall 11L of the crankcase 11 (see FIG. 5). Then, the sprocket cover 35 is disposed in a state in which the cylindrical boss portions 35a and 35b of the sprocket cover 35 are in contact with the front end fastening portion 30a and the rear-side fastening portion 30b of the chain guide 30 (see FIG. 2). Further, fastening bolts 40a and 40b are inserted into the cylindrical boss portions 35a and 35b and the fastening portions 30a and 30b, put into screw engagement with the fastening boss portions 11a and 11b and tightened. By these operations, the chain guide 30 and the sprocket cover 35 are co-fastened to the fastening boss portions 11a and 11b of the crankcase 11. See, FIGS. 2 and 3.

When the chain guide 30 is mounted to the left side wall 11L of the crankcase 11 in this way, the guide surface 31 of the chain guide 30 is so arranged that the spacing between itself and the drive chain 24 gradually increases along an obliquely upward direction from its front end portion 31f, at which the spacing is the smallest, to its rear end portion 31r. In this arrangement, the rear end portion 31r of the guide surface 31 of the chain guide 30 restrains vertical vibrations of the drive chain 24. In addition, the front end portion 31f of the guide surface 31, at which the guide surface 31 is situated closest to the drive chain 24, securely prevents the drive chain 24 from being disengaged from the drive sprocket 23.

Figure 6:
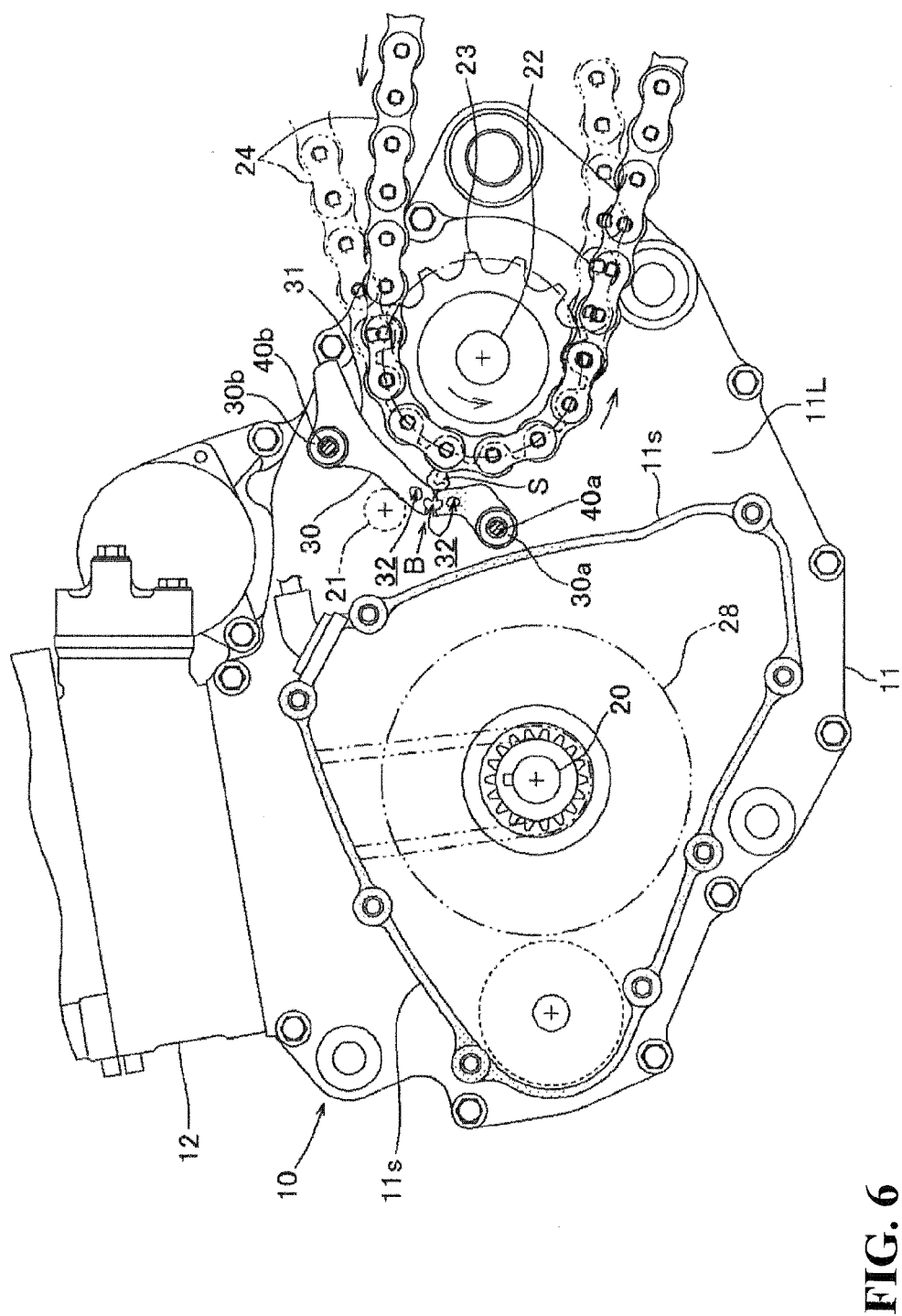
FIG. 6 is a partial side view for explaining a state where a small stone has got nipped between the chain guide of the internal combustion engine and a drive chain.

Referring to FIG. 6, a solid matter such as a small stone may be drawn in between the rotationally moving drive chain 24 and the guide surface 31 of the chain guide 30, in the manner of being dragged by the drive chain 24 from the upper rear side where the spacing between the drive chain 24 and the guide surface 31 is large. In such a situation, the solid matter S having a significant size that is being dragged in forward comes gradually to be clamped between the drive chain 24 and the chain guide 30 so arranged that the spacing therebetween gradually decreases along a forward direction. Eventually, at the brittle portion B in the upper vicinity of the front end portion 31f of the guide surface 31 of the chain guide 30 at which the guide surface 31 is situated closest to the drive chain 24, the solid matter S is nipped between the brittle portion B and the drive chain 24, exerting a great impact load on the brittle portion B.

As illustrated in FIG. 6, the brittle portion B of the chain guide 30 is lower in strength than the other portions due to the presence of the small circular holes 32 provided as lightening holes. Therefore, the impact load causes rupture of the brittle portion B of the chain guide 30.

As illustrated in FIG. 6, at the brittle portion B of the chain guide 30 formed in the arcuate shape, the rupture occurs in the position of at least one of the three small circular holes 32. Upon the rupture, the chain guide 30 is greatly deformed on both sides of the ruptured portion thereof. The chain guide 30 is ruptured wide open on the arcuate shape's outer circumference side of the position of the small circular hole 32. Consequently, the solid matter S is clamped in the enlarged gap between the ruptured brittle portion B and the drive chain 24.

In this instance, that portion of the chain guide 30 which is on the front side of the ruptured portion may be slightly moved rotationally (in one direction) about the fastening bolt 40a on the front side, and that portion of the chain guide 30 which is on the rear side of the ruptured portion may be slightly moved rotationally (in the opposite direction) about the fastening bolt 40b on the rear side.

Therefore, the impact is absorbed by the rupturing at the brittle portion B of the chain guide 30, so that the impact does not exert any influence on the crankcase 11. Thus, the crankcase 11 can be protected from damage.

Note that the solid matter S that got nipped springs out leftwardly or rightwardly by the frictional contact therewith of a rugged portion of the rotationally moving drive chain 24.

The solid matter S sprung toward the outside along the vehicle widthwise direction is easily released to the exterior through the arcuate opening 35h formed in the sprocket cover 35.

Thus, when a solid matter S has got nipped between the guide surface 31 of the chain guide 30 and the drive chain 24, the brittle portion B of the chain guide 30 ruptures, absorbing the impact and thereby protecting the crankcase 11. Accordingly, it is possible at low cost to perform an easy repair, by replacing only the chain guide 30, which is inexpensive.

The solid matter dragged in may be small-sized so that it will not exert an impact load strong enough to rupture the brittle portion B even if nipped at the brittle portion B in the upper vicinity of the front end portion 31f situated closest to the drive chain 24. In such a case, the solid matter is readily discharged downwardly via the front end portion 31f, which is also the lower end portion of the guide surface 31 of the chain guide 30, to the exterior. Therefore, the load exerted on the chain guide 30 in this situation can be swiftly removed.

The front end fastening portion 30a and the rear-side fastening portion 30b at which the chain guide 30 is fastened to the crankcase 11 are not provided in the direction from the center of rotation of the drive sprocket 23 (the axis of the counter shaft 22) toward the brittle portion B. This ensures that even when a solid matter S is nipped between the chain guide 30 and the drive chain 24 and an impact load is exerted on the brittle portion B, the impact load would not be exerted directly on the front end fastening portion 30a and the rear-side fastening portion 30b, in other words, on the fastening boss portions 11a and 11b of the crankcase 11. Therefore, the influence, if any, of the impact load can be lessened. Accordingly, such troubles as deformation of the fastening boss portions 11a and 11b of the crankcase 11 can be avoided.

In addition, the impact load can be concentrated on the brittle portion B, instead of receiving it by the front end fastening portion 30a and the rear-side fastening portion 30b, that is, by the fastening boss portions 11a and 11b. As a result, the brittle portion B can be ruptured solely and easily.

Note that the fastening boss portions 11a and 11b are formed to be brittle. When the impact load on the brittle portion B of the chain guide 30 is high so as to influence the fastening boss portions 11a and 11b as well, deformation of the fastening boss portions 11a and 11b occurs concurrently with the rupture of the brittle portion B. This permits a more assured absorption of the impact and an easier discharge of the solid matter S.

In addition, any damage to the crankcase 11 can be limited to only the deformation of the fastening boss portions 11a and 11b.

In the chain guide 30 according to this embodiment, the brittle portion B is formed by providing the three small circular holes 32. By the simple thinning process of boring the circular holes. Therefore, the brittle portion B can be formed at low cost.

The brittle portion of the chain guide can also be formed by thinning in any other form than the circular holes.

The method for forming the brittle portion is not limited to the thinning. For instance, the brittle portion can be formed by providing a notch or notches at a side edge or edges of the arcuate plate-like member, by partially reducing the width of the arcuate plate-like member, or by partially reducing the material thickness of the arcuate plate-like member. Various other methods can also be contemplated for forming the brittle portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain guide structure for a chain drive transmission mechanism comprising:
   a drive chain for transmitting motive power, the drive chain being looped around and between a drive sprocket and a driven sprocket, the drive sprocket being fitted to an output shaft protruding outside from an engine case of an internal combustion engine mounted on a vehicle, the driven sprocket being provided on a side of a rear wheel;
   a chain guide fastened to the engine case is provided for covering the drive chain wound around the drive sprocket, at a part of a periphery of the drive sprocket and in an arcuate form; and
   said chain guide being formed with a brittle portion lower in strength than other portions thereof, the brittle portion being located in an upper vicinity of a front end portion at which the chain guide is situated closest to the drive chain.

2. The chain guide structure for a chain drive transmission mechanism according to claim 1, wherein a guide surface, facing the drive chain, of the chain guide is disposed so that a spacing between the guide surface and the drive chain gradually increases along an obliquely upward direction from the front end portion at which the spacing is the smallest.

3. The chain guide structure for a chain drive transmission mechanism according to claim 1, wherein the brittle portion of the chain guide is formed by thinning.

4. The chain guide structure for a chain drive transmission mechanism according to claim 2, wherein the brittle portion of the chain guide is formed by thinning.

5. The chain guide structure for a chain drive transmission mechanism according to claim 1, wherein a fastening portion, fastened to the engine case, of the chain guide is provided in a position which is not in a direction from a center of rotation of the drive sprocket toward the brittle portion.

6. The chain guide structure for a chain drive transmission mechanism according to claim 2, wherein a fastening portion, fastened to the engine case, of the chain guide is provided in a position which is not in a direction from a center of rotation of the drive sprocket toward the brittle portion.

7. The chain guide structure for a chain drive transmission mechanism according to claim 3, wherein a fastening portion, fastened to the engine case, of the chain guide is provided in a position which is not in a direction from a center of rotation of the drive sprocket toward the brittle portion.

8. The chain guide structure for a chain drive transmission mechanism according to claim 5, wherein the chain guide is fastened at its fastening portion to a fastening boss portion which is formed to project from the engine case and to be brittle.

9. The chain guide structure for a chain drive transmission mechanism according to claim 1,
   wherein the guide surface of the chain guide is configured so that:
   the front end portion thereof situated closest to the drive chain is a lower end portion thereof; and
   a portion thereof in a vicinity of a position where the drive chain starts being wound around the drive sprocket is a rear end portion thereof.

10. The chain guide structure for a chain drive transmission mechanism according to claim 2,
    wherein the guide surface of the chain guide is configured so that:
    the front end portion thereof situated closest to the drive chain is a lower end portion thereof; and
    a portion thereof in a vicinity of a position where the drive chain starts being wound around the drive sprocket is a rear end portion thereof.

11. The chain guide structure for a chain drive transmission mechanism according to claim 3,
    wherein the guide surface of the chain guide is configured so that:

the front end portion thereof situated closest to the drive chain is a lower end portion thereof; and a portion thereof in a vicinity of a position where the drive chain starts being wound around the drive sprocket is a rear end portion thereof.

12. The chain guide structure for a chain drive transmission mechanism according to claim 5, wherein the guide surface of the chain guide is configured so that:

the front end portion thereof situated closest to the drive chain is a lower end portion thereof; and a portion thereof in a vicinity of a position where the drive chain starts being wound around the drive sprocket is a rear end portion thereof.

13. The chain guide structure for a chain drive transmission mechanism according to claim 7, wherein the guide surface of the chain guide is configured so that:

the front end portion thereof situated closest to the drive chain is a lower end portion thereof; and a portion thereof in a vicinity of a position where the drive chain starts being wound around the drive sprocket is a rear end portion thereof.

14. A chain guide structure for a chain drive transmission mechanism comprising:

a drive chain for transmitting motive power, the drive chain being looped around and between a drive sprocket and a driven sprocket;

a chain guide for covering the drive chain wound around the drive sprocket, at a part of a periphery of the drive sprocket and in an arcuate form; and said chain guide being formed with a brittle portion lower in strength than other portions thereof, the brittle portion being located in an upper vicinity of a front end portion at which the chain guide is situated closest to the drive chain.

15. The chain guide structure for a chain drive transmission mechanism according to claim 14, wherein a guide surface, facing the drive chain, of the chain guide is disposed so that a spacing between the guide surface and the drive chain gradually increases along an obliquely upward direction from the front end portion at which the spacing is the smallest.

16. The chain guide structure for a chain drive transmission mechanism according to claim 14, wherein the brittle portion of the chain guide is formed by thinning.

17. The chain guide structure for a chain drive transmission mechanism according to claim 14, wherein a fastening portion, fastened to the engine case, of the chain guide is provided in a position which is not in a direction from a center of rotation of the drive sprocket toward the brittle portion.

18. The chain guide structure for a chain drive transmission mechanism according to claim 16, wherein a fastening portion, fastened to an engine case, of the chain guide is provided in a position which is not in a direction from a center of rotation of the drive sprocket toward the brittle portion.

19. The chain guide structure for a chain drive transmission mechanism according to claim 17, wherein the chain guide is fastened at its fastening portion to a fastening boss portion which is formed to project from the engine case and to be brittle.

20. The chain guide structure for a chain drive transmission mechanism according to claim 14, wherein the guide surface of the chain guide is configured so that:

the front end portion thereof situated closest to the drive chain is a lower end portion thereof; and a portion thereof in a vicinity of a position where the drive chain starts being wound around the drive sprocket is a rear end portion thereof.

* * * * *